United States Patent [19]

Drawert et al.

[11] 4,206,097
[45] Jun. 3, 1980

[54] SYNTHETIC RESIN MIXTURES

[75] Inventors: Manfred Drawert, Froendenberg; Horst Krase, Rhynern, both of Fed. Rep. of Germany

[73] Assignee: Schering Aktiengesellschaft, Berlin and Bergkamen, Fed. Rep. of Germany

[21] Appl. No.: 15,659

[22] Filed: Feb. 27, 1979

Related U.S. Application Data

[63] Continuation-in-part of Ser. No. 926,247, Jul. 20, 1978, abandoned.

[30] Foreign Application Priority Data

Jul. 26, 1977 [DE] Fed. Rep. of Germany ....... 2733597
Mar. 17, 1978 [DE] Fed. Rep. of Germany ....... 2811700

[51] Int. Cl.² ...................... C08L 63/00; C08L 91/00
[52] U.S. Cl. ........................... 260/18 EP; 260/18 PN;
260/23 EP; 525/423; 525/526
[58] Field of Search ...... 260/83 EP, 830 TW, 18 EP, 260/18 PN, 23 EP

[56] References Cited

U.S. PATENT DOCUMENTS

| | | | |
|---|---|---|---|
| 3,280,054 | 10/1966 | Gotze | 260/18 |
| 3,629,181 | 12/1971 | Heer | 260/33.4 EP |
| 3,673,273 | 6/1972 | Schmitt | 260/830 TW |
| 3,900,437 | 8/1975 | Preston | 260/18 PN |
| 4,086,197 | 4/1978 | Bouche | 260/18 PN |

FOREIGN PATENT DOCUMENTS

2361624 6/1974 Fed. Rep. of Germany .
1497377 1/1978 United Kingdom .

*Primary Examiner*—Paul Lieberman
*Attorney, Agent, or Firm*—Curtis, Morris & Safford

[57] ABSTRACT

What is disclosed is synthetic resin mixtures adaptable to use as a binder in surface coatings and in printing inks, which mixtures comprise a first component (A) which is at least one amine selected from the group consisting of (A) (I) a solid polyaminoamide having an amine number from 30 to 200 prepared from an acid component (a) comprising (a) (1) an aliphatic dicarboxylic acid having 6 to 13 carbon atoms, and an excess of an amine component (b) comprising (b) (1) a diamine of the formula

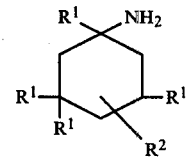

wherein $R^1$ is hydrogen or methyl and $R^2$ is —$CH_2$—$NH_2$ or —$C(CH_3)_2$—$NH_2$, (A) (II) Aminoamide compounds, aminoimidazoline compounds, and aminoamide compounds containing imidazoline groups having amine hydrogen equivalent weights from 90 to 500 and comprising polyalkylenepolyamines of the formula $H_2N$-$(CHR)_x$—$NH]_y$H, wherein R is hydrogen or alkyl having 1 to 4 carbon atoms, x is an integer from 2 to 6, and y is an integer from 2 to 4, (A) (III) (a) amines of the formula $H_2N$-$(CHR)_x$—$NH]_y$H, wherein R, x, and y are as earlier defined, and
(b) amines of the formula $H_xN$—$(CHR)_2$—$NH_2$    III in which R is hydrogen or alkyl having 1 to 4 carbon atoms and x is an integer from 2 to 6, and (A)(IV) a Mannich base having at least two reactive amine hydrogen atoms and suitable for hardening epoxy resins, or wherein said first component (A) is at least one adduct having free amino groups formed by reacting an epoxy resin with an excess of such an amine (A)(I)-(A)(IV), or wherein said first component (A) is a mixture of at least one of said amines (A)(I)-(A)(IV) with at least one of said adducts; and which mixtures further comprise (B) a synthetic resin component having free epoxy groups comprising an adduct formed between a solid polyaminoamide as in (A) (I) and an excess of an epoxy resin.

13 Claims, No Drawings

SYNTHETIC RESIN MIXTURES

This application is a continuation-in-part application of Ser. No. 926,247 filed July 20, 1978 now abandoned.

The present invention relates to hardenable synthetic resin systems comprising adducts formed between polyaminoamides and epoxides, which systems are useful as binding agents for surface coatings and for printing inks for intaglio printing, screen printing, and flexographic printing.

Because of altered packaging techniques, the practical demands made by the modern consumer goods and grocery industries on coating and printing techniques have rapidly escalated in recent years. Thermoplastic binding agents no longer sufficiently provide the required resistance to water, acids, bases, and particularly fats and oils, nor the resistance to high temperature required by constantly-shortening sealing times.

Certain resin systems known in the art are not entirely satisfactory for use in formulating printing inks. Thus, a method is known for preparing synthetic resins by the reaction of polyamides with epoxy compounds, wherein the diamine used for the preparation of a polyamide, which is prepared in a conventional fashion, comprises from 20 to 100 percent of 1-amino-3-aminomethyl-3,5,5-trimethylcyclohexane and the amount of this polyamide in admixture with the epoxy compound is from 10 to 99.8 percent. In this method, the polyamides and epoxy resins are directly mixed, without the prior formation of an adduct. Mixtures of this type are still not satisfactory from the point of view of film formation at room temperature or at slightly elevated temperatures. Hence, the usefulness of this method is correspondingly limited.

The art also describes hardenable mixtures of synthetic resins comprising (A) a synthetic resin component having free amino groups, consisting of an adduct of a solid epoxy resin with an excess of solid polyaminoamide formed from dimeric fatty acid and a diamine, and (B) a synthetic resin component having free epoxy groups, consisting of an adduct of a solid polyaminoamide, formed from a dimeric fatty acid and a diamine, with an excess of a solid epoxy resin, and (C) solvents and optional pigments.

The synthetic resin mixtures are used as paints, printing inks, and adhesives for the lamination of paper and all kinds of films. Print containing these resin mixtures as a binder has sufficient resistance to chemicals as well as good mechanical and thermal properties. However, to obtain clear solutions the solvent must contain a relatively high fraction of aromatics.

Because of the concern for occupational safety and environmental protection which in recent times has become increasingly emphasized, practical demand is for binders, used in coatings and printing inks, which form clear solutions in solvents which are free of aromatics. The use of aromatics is also undesirable from technological grounds. For example, solvents containing aromatics can lead to the swelling of printing rolls.

Thus, the object of the present invention was to provide hardenable binder systems which form clear solutions in solvents free of aromatics, which give physically dry and clear films after evaporation of the solvent, which harden at room temperature or slightly elevated temperatures, and which give coatings or printing inks which meet practical needs from the point of view of chemical demands.

This object has been attained according to the present invention by hardenable synthetic resin mixtures, useful as binders for surface coatings and for printing inks for intaglio, flexographic, and screen printing, which mixtures comprise (A) a solid synthetic resin component having free amino groups, comprising an adduct formed between an epoxy resin and an excess of a polyaminoamide, namely of I. a solid polyaminoamide having an amine number from 30 to 200, particularly from 50 to 150, prepared from an acid component (a) comprising
  (a) (1) an aliphatic dicarboxylic acid having 6 to 13 carbon atoms, or mixtures thereof, optionally with
  (a) (2) an aromatic, araliphatic, or hydroaromatic dicarboxylic acid, which can be optionally alkyl-substituted, and mixtures thereof, in amounts from 0.95 to 0.05 equivalents, calculated on the total number of carboxyl groups, and optionally of
  (a) (3) an aliphatic hydroaromatic, or aromatic monocarboxylic acid or monofunctionally-acting acids or acid anhydrides, optionally in admixture with
  (a) (4) a dimeric fatty acid, and/or an addition product of acrylic acid on an unsaturated fatty acid, and/or heptadecandicarboxylic acid and of an excess of an amine component (b) comprising
  (b) (1) one or more diamines of the formula (I)

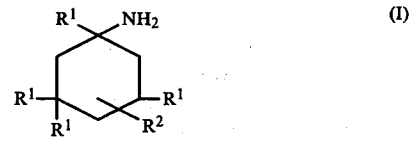

wherein $R^1$ is hydrogen or methyl and $R^2$ is —CH$_2$—NH$_2$ or —C(CH$_3$)$_2$—NH$_2$, optionally together with
  (b) (2) an amine of the formula

wherein R is hydrogen or alkyl having 1 to 4 carbon atoms, x is an integer from 2 to 6, and y is an integer from 2 to 4, and/or (A) II. Aminoamide compounds, and/or aminoimidazoline compounds, and/or aminoamide compounds containing imidazoline groups having amine hydrogen equivalent weights from 90 to 500 comprising polyalkylenepolyamines of the formula

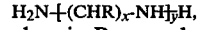
wherein R, x, and y are as earlier defined, and/or
(A) III.
  (a) amines of the formula

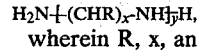
wherein R, x, and y are as earlier defined, or
  (b) amines of the formula $$H_2N-(CHR)_x-NH_2 \qquad III$$

in which R is hydrogen or alkyl having 1 to 4 carbon atoms and x is an integer from 2 to 6, preferably 2, and/or
(A) IV. a Mannich base having at least two reactive amine hydrogen atoms and suitable for hardening epoxy resins, and which mixtures further comprise
(B) a synthetic resin component having free epoxy groups comprising an adduct formed between the solid polyaminoamide as in (A) (I) and an excess of an epoxy resin, and which mixtures may further comprise
(C) non-aromatic solvents and optional pigments when formulated into printing inks and coating agents.

A further object of the invention is the development of hardenable synthetic resin mixtures, useful for surface coatings and for printing inks for intaglio, flexographic, and screen printing which mixtures are free of any adduct (A) formed from amino compounds (II)—(IV).

A further object of the invention is the development of synthetic resin mixtures useful for surface coatings and for printing inks suitable for printing machines running at low speeds, in which systems one or more of the corresponding non-pre-added amine compounds (I), (II), (III), and (IV) can be used instead of, or in combination with, one or more of adducts (A) (I), (A) (II), (A) (III), and (A) (IV), according to choice, whereby amine compound (I) advantageously is used together with one or more of components (II)–(IV).

As aliphatic dicarboxylic acids to be used according to the present invention, the following examples can be named: adipic acid, pimelic acid, suberic acid, azelaic acid, sebacic acid, decamethylenedicarboxylic acid, and brassylic acid.

As aliphatic, araliphatic, and aromatic dicarboxylic acids which can be used according to the invention, the following examples are given: terephthalic acid; isophthalic acid; tetramethylterephthalic acid; cyclohexanedicarboxylic acid-1,4; xylylene diacetic acid; phenylenediacetic acid; fluorenedicarboxylic acid; the addition product of acrylic acid on higher monomeric unsaturated fatty acids having from 16 to 22 carbon atoms; and the dicarboxylic acids obtained by carboxylation of unsaturated higher monomeric fatty acids having 16–22 carbon atoms.

According to the invention, difunctionally-acting polycarboxylic acids can be used, such as: cyclopentanetetracarboxylic acid dianhydride; bicyclo-2,2,2-oct-7-entetracarboxylic acid dianhydride; bicyclo-2,2,2-oct-7-entricarboxylic acid; trimellitic acid anhydride; and pyromellitic acid dianhydride.

Isophthalic acid and terephthalic acids are preferred according to the invention. Alkyl substituents which may possibly be present can have from 1 to 4 carbon atoms, preferably 1 or 2 carbon atoms.

For the adjustment or regulation of the degree of polymerization which may be needed or wanted, as well as of the melt viscosities of the condensation products, the anhydrides of the dicarboxylic acids which are to be used according to the invention, which predominantly form imides with amines under the reaction conditions, can be employed as can monocarboxylic acids. The amount of monofunctional or monofunctionally-acting compounds can be from 0.01 to 0.5 equivalent, calculated on the total acid equivalents, and particularly from 0.1 to 0.5

As typical examples of these compounds are mentioned, in the aromatic series, phthalic acid, phthalic acid anhydride, dimethylphthalic acid, dimethylphthalic acid anhydride, benzoic acid, and naphthalene carboxylic acid.

In the hydroaromatic series, representative materials are tetrahydrophthalic acid anhydride, dimethyltetrahydrophthalic acid anhydride, endomethylene tetrahydrophthalic acid anhydride, and hexahydrophthalic acid anhydride.

In the aromatic series, representatives include straight-chain and branched, optionally unsaturated, acids having from 2 to 22 carbon atoms such as acetic acid, propionic acid, butyric acid, stearic acid, palmitic acid, oleic acid, and tall oil fatty acid.

According to the invention, tetrahydrophthalic acid, hexahydrophthalic acid, acetic acid, and o-phthalic acid are preferably used.

Under the reaction conditions employed, predominantly difunctionally-acting compounds such as aromatic tetracarboxylic acid dianhydrides can also be employed in small amounts. The amounts added depend on the small amide-forming portion of a given dianhydride, since these act as cross-linking agents because of their tri-functionality or tetra-functionality and thus result in a strong increase in viscosity which can lead to gelation. The amount employed must thus be chosen in each case so that these disadvantageous effects remain at a low, acceptable, level.

The dicarboxylic acids according to the invention can also be used in the form of their amide-forming derivatives, such as their esters.

As the dimeric fatty acids which may optionally be employed are to be understood those polymerized acids which are obtained according to known methods from unsaturated natural and synthetic mono-basic aliphatic fatty acids having from 16 to 22 carbon atoms, preferably 18 carbon atoms (cf. German patent publications Nos. 1,443,938; 1,443,968; 1,280,852; and German Pat. No. 2,118,702.)

The dimerized fatty acids typically available in commerce have the following approximate composition:

| | |
|---|---|
| monomeric acids | 5–15 percent by weight |
| dimeric acids | 60–80 percent by weight |
| trimeric and higher functional acids | 10–35 percent by weight |

However, dimeric fatty acids can also be employed which are hydrogenated according to known methods and/or whose dimer fraction has been enriched to more than 80 percent by weight by suitable distillation methods.

As an example of an addition product of acrylic acid and an unsaturated fatty acid, a commercially-available adduct of acrylic acid and of a conjugated $C_{18}$-monocarboxylic acid should be mentioned. Products of this kind can also be hydrogenated. The heptadecanedicarboxylic acids which can optionally also be employed can be obtained according to German Pat. No. 1,006,849.

These optionally-added acids can be present in amounts from 0.05 to 0.8 equivalent, based on the total equivalents.

Within these limits, the values for any particular acid component must be varied according to the nature and amount of the remaining components to obtain the products to be employed according to the present invention. Such variations are self-explanatory to one skilled in the art in question and are observable from the viewpoints of their tendency and effect.

As diamines employed according to the present invention, the following should be named as preferred examples: 3-aminomethyl-3,5,5-trimethyl-cyclohexylamine (isophorone diamine) and 1-methyl-4-(1-amino-1-methyl-ethyl)cyclohexylamine (menthane diamine). The diamines according to the invention can also be employed in admixture with each other and with other amines.

The amines optionally added can be employed in amounts from 0.01 to 0.3 equivalent, particularly 0.1 to 0.25 equivalent, calculated on the total amount of amine. Within these limits, the values must be varied corresponding to the acid component present as well as according to the nature and amount of the remaining components in order to obtain the products according to the invention. Such variations are again self-explanatory for one silled in this art and are observable from the viewpoints of tendency and effect.

The optionally employable amines are encompassed by the formula

wherein x has integral values from 2 to 6 and 6 has integral values from 2 to 4 and R is alkyl having 1 to 4 carbon atoms or is hydrogen. When y is greater than 2, the values of x within the molecule may be the same or different.

As examples can be mentioned: diethylenetriamine; triethylenetetramine; tetraethylenepentamine; dihexamethylenetriamine; and the hydrogenated cyanoethylation products of polyvalent amines such as N-aminopropyl-ethylenediamine and N,N'-bis-(aminopropyl) ethylene diamine.

These amines are commercially-available hardeners for epoxy resins and can also be used as hardeners according to the present invention.

The carboxylic acids and the amines are condensed in such amounts that the resulting polyaminoamides have amine numbers between 30 and 200, particularly between 50 and 150. Examples of their preparation are found in following Table I.

As aminoamides, aminoimidazolines, and aminoamides containing imidazoline groups, the hardening agents for epoxy resins which belong to the state of the art and which are employed in practice are suitable, such as are known, for example, from German patents 972,757 and 1,074,856, from German patent publications Nos. 1,041,246; 1,089,544; 1,106,495; 1,295,869; and 1,250,918; from British Pat. Nos. 803,517; 810,348; 873,224; 865,656; and 956,709; from Belgian Pat. No. 593,299; from French Pat. No. 1,264,244; and from U.S. Pat. Nos. 2,705,223; 2,712,001; 2,881,194; 2,966,478; 3,002,941; 3,062,773; and 3,188,566, all incorporated by reference.

Aminoamides, aminoimidazolines, and aminoamides containing imidazoline groups have proved advantageous for use according to the invention if they are prepared by the reaction of II. (a) (1) monocarboxylic acids, such as straight-chain or branched alkyl carboxylic acids having 2 to 22 carbon atoms, particularly having 2 to 4 and 16-22 carbon atoms, preferably 18 carbon atoms, such as acetic acid, capric acid, lauric acid, and myristic acid, as well as, particularly, the natural fatty acids such as stearic acid, oleic acid, linolic acid, linolenic acid, and tall oil fatty acid, or of (a) (2) the so-called dimeric fatty acids (cf. German patent publications Nos. 1,443,938; 1,443,968; and 1,280,852 and German Pat. No. 2,118,702) which can be obtained according to known methods by the polymerization of unsaturated natural and synthetic mono-basic aliphatic fatty acids having 16 to 22 carbon atoms, preferably 18 carbon atoms. The polymerized fatty acids typically available in commerce have the following approximate composition:

| | |
|---|---|
| monomer acid | 5–15 weight percent |
| dimeric acid | 60–80 weight percent |
| trimeric and higher functional acids | 10–35 weight percent |

However, those fatty acids can also be used whose trimeric and higher-functional acid content or whose dimer fraction has been enriched by suitable distillation methods, as can fatty acids which are hydrogenated according to known methods, or of (a) (3) carboxylic acids obtained by the co-polymerization of unsaturated higher fatty acids having 16 to 22 carbon atoms, particularly 18 carbon atoms, or their esters, with aromatic vinyl compounds (cf. British patent 803,517), or of (a) (4) acids prepared by the addition of phenol or of its substitution products on unaturated monocarboxylic acids such as hydroxyphenyl stearic acid (e.g. German Offenlegungsschrift No. 1,543,754) or 2,2-bis-(hydroxyphenyl)valerianic acid or addition products or phenol on polycarboxylic acids such as dimeric fatty acids (e.g. U.S. Pat. No. 3,468,920), with polyamines in amounts such that the ratio amine groups: carboxylic acid groups is greater than one.

In general, the acids of the aforementioned groups are employed per se for condensation with the polyamines, but mixtures thereof can also be used. The polyaminoamides and polyaminoimidazolines obtained from the monomeric or polymeric fatty acids described above under (II) (a) (1) and (II) (a) (2) have achieved particular technological significance and are thus preferably employed according to the present invention.

As the amine components for preparing the polyaminoamides, polyamines are used such as III. (a) (1) polyalkylene polyamines of the formula

where R, x, and y are as earlier defined, including polyethylene polyamines like diethylene triamine, triethylene tetramine, tetraethylene pentamine, or polypropylene polyamines, as well as the polyamines obtained by the cyanoethylation of other polyamines, particularly of ethylenediamine, with subsequent hydrogenation (commercially available from BASF AG. and described in that company's literature 1976), or III. (a) (2) optionally substituted alkylene polyamines of

where R and x are as earlier defined, the formula, such as ethylene diamine, propylene diamine, butylene diamine, and hexylene diamine, however, particularly, ethylene diamine, or III. (a) (3) mixtures of two or more of the amines earlier described under (A) (II) and (A) (III). According to the invention, the polyamines described immediately above under (III) (a) (1) are preferred.

Aminoamides or aminoamides containing imidazoline groups which are preferred according to the invention have amine hydrogen equivalent weights from about 90 to about 500.

The term "Mannich bases", as used in the context of the present invention, is to be understood to refer to the reaction products of phenols, formaldehyde, and secondary amines. As phenols, monophenols such as phenol, ortho-, meta-and para-cresol, the isomeric xylenols, para-t-butyl-phenol, para-nonylphenol, α-naphthol, and β-naphthol can be used, as well as diphenols and polyphenols such as resorcinol, hydroquinone, 4,4'-dioxydiphenyl, 4,4'-dioxydiphenylether, 4,4'-dioxydiphenylsulfone, 4,4'-dioxydiphenylmethane, and bisphenol A, as well as the condensation products of phenol and formaldehyde which are designated as novolacs.

Dimethylamine, diethylamine, dipropylamine, dibutylamine, piperidine, pyrrolidine, morpholine and methylpiperazine can be used as secondary amines.

A comprehensive enumeration of the phenols and amines which can be employed is found in the article by M. Tramontini, Syntheses 1973, page 703, incorporated herein by reference. Reference is made to this literature source also for information concerning the preparation of the Mannich bases.

The molar amounts of formaldehyde and amine used per mol of phenol depend on the number of group capable of substitution: In phenol, there are three such groups, in bisphenol A there are four, and two in para-t-butyl-phenol.

The preferred Mannich bases to be used according to the invention are the reaction products of phenol or bisphenol A, of formaldehyde, and of dimethylamine, having 1 to 4 tertiary amino groups.

If novolacs are used as the phenol component, Mannich bases having up to 10 and more secondary amino groups are obtained.

In the reaction of the Mannich bases with aminoamides, all of the tertiary amino groups of the Mannich bases can be exchanged.

The amine exchange reaction occurs if a Mannich base and an aminoamide, optionally in the presence of inert solvents, are heated with stirring to temperatures greater than 100° C., preferably from 130° C. to 180° C. The secondary amine which is liberated within 0.5 to 3 hours is distilled into a cooled receiver. According to gas chromatographic analysis, the amine distilled off is so pure that it can be used again for the preparation of the initial Mannich base without further processing.

The epoxy resins used according to the invention are glycidyl ethers having more than one epoxy group per molecule. They are derived from polyvalent phenols, particularly bisphenols, as well as from novolacs, and they have epoxy values between 0.100 and 0.600, however particularly between 0.200 and 0.550.

It is preferred to operate with the following mixing ratios, depending on the amine number and epoxy value:

| Polyaminoamide hardener Amine Number | | | Epoxy Resin Epoxy value | | |
|---|---|---|---|---|---|
| 50–85 | 85–118 | 115-150 | 0.200–0.225 | 0.390–0.440 | 0.520–0.550 |
| 100 g | — | — | 85–144 g | 43–72 g | 34–57 g |
| — | 100 g | — | 144–195 g | 72–98 g | 57–77 g |
| — | — | 100 g | 195–254 g | 98–127 g | 77–101 g |

These mixing ratios can be undercut or exceeded in practice. However, they should be so selected that printed films prepared therefrom still have good chemical and thermal resistance.

Generally, the following requirements are imposed on the individual components and on the end product:

The aminoamide must be soluble in solvents which are free of aromatics; the aminoamide must be compatible with the epoxy compound used therewith; adduct (A) must be compatible with adduct (B); and the mixture of adducts must be clear both as a physically dry film as well as a hardened film.

If the hardenable synthetic resin systems according to the invention are employed as binders for printing inks, the individual components are best employed in the form of their adducts, since in this case the film becomes physically dry very quickly and hardening also follows rapidly. For modern printing processes proceeding at high rates of speed, this is an important factor.

If only one of the components is employed as an adduct or if adduct formation is rejected entirely—which is completely possible when aromatic acid anhydrides are employed—films with the same final physical and chemical properties are obtained. However, since more time is required until a physically dry or hardened film is obtained, this procedure is as a rule preferred for coatings and for printing processes operating at low speeds.

Solvents for the synthetic resins used according to the present invention are also chosen with a view to the printing process to be employed.

Thus, for printing processes operating at high rates of speed (rotation printing), rapidly evaporating solvents such as mixtures of lower aliphatic alcohols having 2 to 4 carbon atoms: esters such as ethyl acetate, propyl acetate, isopropyl acetate, butyl acetate, and isobutyl acetate; ketones such as acetone, methylethyl ketone, methylisobutyl ketone, and methyl-n-butyl ketone; and gasoline mixtures with boiling limits between 60° C. and 160° C. are employed; particularly, however, mixtures of ethanol and ethyl acetate.

For printing processes operating at slow speeds, such as screen processes, or also for surface coating, solvents having relatively long evaporation times can also be used, such as the glycol ether and glycol acetate commonly used in this field, optionally in admixture with other solvents suitable for whatever printing process is contemplated.

Inorganic and organic substrates can be imprinted or coated using the binder systems of the present invention. Included are the films conventional in the printing industry, such as those of polyamides, polyesters, or polyesteramides; heat-sensitive films of polyethylene and polypropylene, for example; co-extrusion films of polyethylene and polypropylene; untreated cellulose films or cellulose films coated with polymers or lacquered with nitrocellulose; paper; cardboard; polyvinylchloride or copolymers thereof; and metal foils such as aluminum foil. Combinations of these materials are also possible. The coatings can also be applied on materials conventionally used in construction, for example concrete, metal, wood, or plastics.

A description follows of the preparation of the adducts having free amino groups and free epoxy groups, respectively.

1. Hardener Adducts (a) The polyaminoamide hardeners which are employed are preferably dissolved in a solvent or solvent mixture to form a 50 percent solution and then well mixed with a portion of the amount of epoxy resin necessary for complete hardening, optionally also preferably dissolved in a solvent or solvent mixture to give a 50 percent solution. After standing for about two days at room temperature, or for correspondingly shorter times at elevated temperatures (for example 16 hours at 40° C.), the pre-reaction is concluded and the adduct is ready for use.

(b) The polyaminoamide hardener to be employed is dissolved with stirring, together with a portion of the amount of epoxy resin necessary for complete hardening, in a solvent or solvent mixture at room temperature preferably to give a 50 percent solution. After standing for about two days at room temperature or for correspondingly smaller times at higher temperatures (for example 16 hours at 40° C.), the pre-reaction is concluded and the adduct is ready for use.

2. Epoxy Resin Adducts (a) The epoxy resin to be used is preferably dissolved in a solvent or solvent mixture to give a 50 percent solution and is then well mixed with a portion of the amount of polyaminoamide hardener necessary for complete hardening, also preferably dissolved in a solvent or solvent mixture to give a 50 percent solution. After standing for about two days at room temperature or for a correspondingly shorter time at elevated temperatures (for example about 15 hours at 40° C.), the pre-reaction is concluded and the adduct is ready for use.

(b) The epoxy resin to be employed is dissolved at room temperature with stirring together with a portion of the amount of polyaminoamide hardener necessary for complete hardening in a solvent or solvent mixture, preferably to give a 50 percent solution. After standing for about two days or for correspondingly shorter times at higher temperatures (for example about 15 hours at 40° C.), the pre-reaction is concluded and the adduct is ready for use.

(c) The epoxy resin to be used is dissolved in a solvent or solvent mixture, preferably to give a 50 percent solution, and is then well mixed with a portion of the amount of hardener adduct according to 1(a) and 1(b) necessary for complete hardening. After standing for about two days at room temperature or for correspondingly shorter times at elevated temperatures (for example 16 hours at 40° C.), the reaction is concluded and the adduct is ready for use.

The degree of pre-addition for the individual adducts lies between 24 pbw of polyaminoamide: 1 pbw of epoxy resin (or 24 pbw of epoxy resin: 1 pbw of polyaminoamide) and 15 pbw of polyaminoamide: 10 pbw of epoxy resin (or 15 pbw of epoxy resin: 10 pbw of polyaminoamide), particularly, however, these ratios are between 22:3 and 17:8. As far as possible, this range of pre-addition of the adduct solutions should not be exceeded since, otherwise, gelation phenomena may occur in too short a period of time.

The polyaminoamide components and epoxy resin components set forth in following Tables II and III by way of illustration need not be the same in both adducts but can also be varied as desired.

For the preparation of synthetic resin mixtures ready for use, the individual adduct solutions can be mixed as follows:

(A) Hardener adduct according to 1(a) + epoxy resin adduct according to 2(a)
(B) Hardener adduct according to 1(a) + epoxy resin adduct according to 2(b)
(C) Hardener adduct according to 1(a) + epoxy resin adduct according to 2(c)
(D) Hardener adduct according to 1(b) + epoxy resin adduct according to 2(a)
(E) Hardener adduct according to 1(b) + epoxy resin adduct according to 2(b)
(F) Hardener adduct according to 1(b) + epoxy resin adduct according to 2(c)

For preparation of synthetic resin mixtures in practice, method (C) is preferred for reasons related to proceeding on a technical scale.

A better understanding of the present invention and for its many advantages will be had by referring to the following specific examples, given by way of illustration.

EXAMPLE 1

44 g of polyaminoamide hardener according to No. 1, Table I, are dissolved in a mixture of 22 g of ethanol and 22 g of ethyl acetate with stirring and gentle warming. 12 g of a 50 percent solution of a solid bisphenol-A-epoxy resin having an epoxy value of 0.210, in ethanol-/ethyl acetate (1:1), are added to this solution and mixed well. After about 15 hours' standing at 40° C., the pre-reaction is concluded and the hardener adduct is ready for use.

EXAMPLE 2

40 g of a solid bisphenol-A-epoxy resin having an epoxy value of 0.210 are dissolved with stirring and gentle warming in a mixture of 20 g of ethanol and 20 g of ethyl acetate. 20 g of a hardener adduct solution as described in Example 1 are added to this solution and mixed well. After standing for about two days at room temperature, the pre-reaction is concluded and the epoxy resin adduct is ready for use.

Printing inks can be prepared from the resin systems of the invention as follows:

After final preparation, the solution of hardener adduct or the solution of epoxy resin adduct—and optionally both—can be pigmented using dispersing apparatus conventional in the printing ink industry. Organic and inorganic pigments, as well as soluble dyestuffs, can be employed for this purpose. After mixing of the hardener adduct and of the epoxy resin adduct in the correct mixing ratio (cf. following Table IV), the finished printing inks are diluted to the correct printing viscosity according to the requirements of whatever printing process is employed.

A selection of the printing inks so prepared were printed with a commercial press from roll to roll onto polyethylene. The print was physically dry immediately after evaporation of the solvent so that there was no adhesion or print-off of the colors onto the backside of the rolled up film. After standing for seven days at room temperature, the printing was subjected to extensive testing of a kind conventional in the printing ink industry. The values for the mechanical, chemical, and thermal resistance properties are presented in following Table V.

The test methods employed are described below:

1. Adhesion

The test for the adhesion of the printed films on a printed substrate is done with "Tesafilm" strips. In each case, ten strips adhered to the printed substrate are torn off therefrom quickly or slowly.

2. Resistance to Scratching

The printed film is scratched more or less strongly with a fingernail.

3. Resistance to Chemicals

Mechanical properties such as adhesion, scratch resistance, and resistance to scouring of the printed film are tested after 24-hours' storage in the chemicals of interest, both directly after removal from the test medium as well as after a 10-minute recovery time in air, and are correspondingly evaluated.

4. Blocking point

The printed film, folded on itself, is stored under a load of 60 g/cm$^2$ at a temperature which is increased daily by 10° C. The blocking point is taken as that temperature at which the films first show slight damage when unfolded.

Evaluation of Test Procedures 1-3
1. Very good (perfect film)
2. Good (isolated punctiform damage)
3. Satisfactory (visible damage)
4. Sufficient (large-area damage to the film)
5. Unsatisfactory (film destroyed)

Evaluation of Test Procedure 4

The critical temperature. That is the temperature at witch the film first shows slight damage.

As the values reported in Table V show, better resistance to chemicals and, above all, a significantly higher resistance to heat (blocking point) is obtained using the synthetic resin mixtures of the present invention as binders in printing inks than is observed for the one-component printing inks which are currently in use (e.g. those comprising polyamide resins and/or nitrocellulose).

It has further been found that the resistance to chemicals can be even more improved if fractional amounts of the polyaminoamide resins of the invention are replaced by commercially-available hardeners (comprising amines) for epoxy resins at toom temperature (cf. following Table X).

The ratio of the described polyaminoamide hardener A (I) to the commercially-available hardeners for epoxy resins A (II-IV) should lie between 10:1 to 0.5:1, however preferably between 6:1 and 2:1.

Since the commercially-available hardeners are almost exclusively liquid products, larger amounts are not suitable for use in printing inks used with rapidly-operating rotation printing machines, since otherwise the printing speed must be reduced to a certain degree because of the surface tackiness which arises, and such a reduction in speed is not acceptable for economic reasons.

In contrast, for printing processes operating slowly, such as screen printing, and for conventional surface coating, the mixing ratios can be broadened according to the requirements at hand.

From the group of typical commercially-available hardeners for epoxy resins, the products reported in Table VIIa were tested.

Not all of the polyaminoamide hardeners disclosed according to the present invention can be combined with commercially-available hardeners for epoxy resins. Thus, it was found that hardeners 1-4 for epoxy resins as noted in Table VIIa are only compatible (i.e. give clear, unclouded solutions) with those polyaminoamide hardeners in which commercially-available dimerized fatty acids are condensed. Hardeners 5-11 of Table VIIa, in contrast, can be combined with all of the described polyaminoamide hardeners without difficulty (See Table VI).

In addition to methods 1(a) and 1(b) earlier described herein for preparing hardener adducts, methods 1(c)-1(f) relating in particular to Table VII are reported below:

1. (c) The polyaminoamide hardener to be employed is dissolved together with a commercially-available hardener in a solvent or solvent mixture, preferably to give a 50 percent solution, and is well mixed with a portion of the amount of epoxy resin necessary for complete hardening, the latter also preferably being dissolved in a solvent or solvent mixture to give a 50 percent solution. After standing for about two days at room temperature or for a correspondingly shorter time at elevated temperatures (e.g. for 16 hours at 40° C.), the pre-reaction is practically concluded and the adduct is ready for use.

(d) The polyaminoamide hardener to be employed is dissolved together with a commercially-available hardener at room temperature with stirring together with a portion of the amount of epoxy resin necessary for complete hardening in a solvent or solvent mixture, preferably to give a 50 percent solution. After standing for about two hours at room temperature or for a correspondingly shorter time at higher temperatures (e.g. 16 hours at 40° C.), the pre-reaction is practically concluded and the adduct is ready for use.

(e) One or more of the commercially available conventional hardeners (A) II-(A) IV is dissolved in a solvent or solvent mixture to give a 50 percent solution and is well mixed with a portion of the amount of epoxy resin necessary for complete hardening, the latter also preferably being dissolved in a solvent or solvent mixture to give a 50 percent solution. After standing for about two days at room temperature or for a correspondingly shorter time at elevated temperatures (e.g. for 16 hours at 40° C.), the pre-reaction is practically concluded and the adduct is ready for use.

(f) One or more of the commercially available conventional hardeners is mixed with a portion of the amount of epoxy resin necessary for complete hardening in a solvent or solvent mixture, preferably to give a 50 percent solution. After standing for about two hours at room temperature or for a correspondingly shorter time at higher temperatures (e.g. 16 hours at 40° C.), the pre-reaction is practically concluded and the adduct is ready for use.

The preparation of storage-stable epoxy resin adducts (c.f. Table III) can in this case only be carried out using polyaminoamide hardeners according to the invention using the methods earlier described under 2(a) and 2(b), since if fractional amounts of a commercially available hardener are employed, a premature gelation of the epoxy resin adduct would occur. It is for this reason that the preparation of epoxy resin adducts according to aforementioned method 2(c) is not suitable.

The pre-addition ratios for the various adducts similarly lie between 24 pbw polyaminoamide: 1 pbw epoxy resin (or 24 pbw epoxy resin: 1 pbw polyaminoamide) and 15 pbw polyaminoamide: 10 pbw epoxy resin (or 15 pbw epoxy resin: 10 pbw polyaminoamide)

However, particularly suitable ratios are between 22:3 and 17:8.

This range of pre-addition of the adduct solutions should not be exceeded, since, otherwise, gelation phenomena may occur in too short a time.

The polyaminoamide components and epoxy resin components set forth in Tables VII and VIII need not be the same in both adducts, but can be varied in desired fashion.

For the preparation of synthetic resin mixtures ready for use, the individual adduct solutions can be mixed as follows:

---

(A) Hardener adduct according to 1(c) + epoxy resin adduct according to 2(a)
(B) Hardener adduct according to 1(c) + epoxy resin adduct according to 2(b)
(C) Hardener adduct according to 1(d) + epoxy resin adduct according to 2(a)
(D) Hardener adduct according to 1(d) + epoxy resin adduct according to 2(b)
(E) Hardener adduct according to 1(e) + epoxy resin adduct according to 2(a)
(F) Hardener adduct according to 1(e) + epoxy resin adduct according to 2(b)
(G) Hardener adduct according to 1(f) + epoxy resin adduct according to 2(a)
(H) Hardener adduct according to 1(f) + epoxy resin adduct according to 2(b)

---

In practice, the preparation of resin mixtures is preferably carried out according to (A) and (E) for reasons relating to performing the methods on a technical scale.

In special cases, it is also possible to prepare mixtures ready for use in which the epoxy resin adduct is combined with non-adducted hardener mixture. In these cases, however, a significantly smaller printing speed must in part be reckoned with. However, for normal surface coating, the protracted surface tackiness is not of such decisive significance so that use in this field is perfectly possible. This is true also for printing processes, such as screen printing, which operate slowly.

EXAMPLE 3

33 g of polyaminoamide hardener No. 35 (Table I) and 11 g of commercially available hardener for epoxy resin No. 6 (Table VIIa) are dissolved together in a mixture of 22 g of ethanol and 22 g of ethyl acetate with stirring and gentle warming. 12 g of a 50 percent solution of a solid bisphenol A-epoxy resin having an epoxy value of 0.210 and dissolved in ethanol/ethyl acetate (1:1) are added to this solution and mixed well. After standing for about 15 hours at 40° C., the pre-reaction is practically concluded and the hardener adduct is ready for use.

EXAMPLE 4

42 g of a solid bisphenol A-epoxy resin having an epoxy value of 0.210 are dissolved in a mixture of 21 g of ethanol and 21 g of ethyl acetate with stirring and gentle warming. 16 g of a 50 percent solution of polyaminoamide hardener No. 35 (Table 1) in ethanol-/ethyl acetate (1:1) are added to this solution and mixed well. After standing for about three days at room temperature, the pre-reaction is practically concluded and the epoxy resin adduct is ready for use.

EXAMPLE 5

44 g of commercially-available hardener No. 5 of Table VIIa are dissolved with stirring in a mixture of 22 g of ethanol and 22 g of ethyl acetate. 12 g of a 50 percent solution of a solid bisphenol A-epoxy resin having an epoxy value of 0.210 and dissolved in ethanol-/ethyl acetate (1:1) are added to this solution and mixed well. After standing for about 15 hours at 40° C., the pre-reaction is practically concluded and the hardener adduct is ready for use.

The combinations reported in following Table IX were prepared corresponding to preceding Examples 3, 4, and 5.

The abbreviations in the Examples entered in Table I have the following meanings:

---

Acids
| | |
|---|---|
| THPA | = tetrahydrophthalic acid anhydride |
| HHPA | = hexahydrophthalic acid anhydride |
| PA | = phthalic acid anhydride |
| DMT | = dimethyl terephthalate |
| IPA | = isophthalic acid |
| CPTD | = cyclopentane tetracarboxylic acid dianhydride |
| DTHPA | = dimethyl tetrahydrophthalic acid anhydride |
| BTDA | = bicyclo-2,2,2-oct-7-tetracarboxylic acid dianhydride |
| ETHPA | = endomethylene tetrahydrophthalic acid anhydride |
| DFS | = dimeric fatty acid |
| DCMB | = 2,6-dimethyl-4-carboxymethyl-benzene |
| Diacid 1550 | = addition product of acrylic acid on unsaturated $C_{18}$-monocarboxylic acid |

Amines
| | |
|---|---|
| IPD | = isophorone diamine |
| DTA | = diethylene triamine |
| DPTA | = dipropylene triamine |
| DHTA | = dihexamethylene triamine |
| $N_4$-Amine | = N,N'-γ-aminopropyl-1,2-diaminoethane |

---

The melting points reported were determined under a microscope.

Table I

| | | Polyaminoamide Composition | | | | | | |
|---|---|---|---|---|---|---|---|---|
| Example | Acid I (g) | | Acid II (g) | Equivalents | Amine I (g) | Amine II (g) | Melting Point (°C.) | Amine Number |
| 1 | 180.00 | adipic adic | | 1.0 | 281.51 | IPD | 151 | 96 |
| 2 | 170.00 | " | | 1.0 | 309.02 | " | 148 | 136 |
| 3 | 180.00 | " | | 1.0 | 269.36 | " | 153 | 76 |
| 4 | 210.00 | azelaic acid | | 1.0 | 261.84 | " | 130 | 106 |
| 5 | 230.00 | decamethylene dicarboxylic acid | | 1.0 | 243.68 | " | 112 | 112 |
| 6 | 190.00 | brassylic acid dimethyl ester | | 1.0 | 176.65 | " | 100 | 91 |
| 7 | 80.00 | adipic acid | 125.90 decamethylene | 0.5 : 0.5 | 258.51 | " | 131 | 112 |

Table I-continued

Polyaminoamide Composition

| Example | | | | dicarboxylic acid | | | | | | |
|---|---|---|---|---|---|---|---|---|---|---|
| 8 | 85.00 | " | 110.27 | azelaic acid | 0.5 : 0.5 | 270.43 | | | 138 | 103 |
| 9 | 56.25 | " | 219.28 | dimerized fatty acid | 0.5 : 0.5 | 205.29 | " | | 87 | 103 |
| 10 | 56.25 | " | 219.28 | hydrogenated dimerized fatty acid | 0.5 : 0.5 | 205.29 | " | | 88 | 101 |
| 11 | 81.00 | decamethylene dicarboxylic acid | 200.65 | dimerized fatty acid | 0.5 : 0.5 | 193.18 | " | | 84 | 91 |
| 12 | 140.00 | azelaic acid | 80.08 | heptadecane dicarboxylic acid | 0.75 : 0.25 | 238.77 | " | | 117 | 94 |
| 13 | 140.00 | azelaic acid | 95.27 | diacid 1550 | 0.75 : 0.25 | 241.50 | " | | 118 | 92 |
| 14 | 176.00 | decamethylene dicarboxylic acid | | | 1.0 | 196.00 | menthane diamine | | 127 | 53 |
| 15 | 180.00 | azelaic acid | | | 1.0 | 114.06 | menthane diamine | 112.20 IPD | 126 | 68 |

| Example | Acid I (g) | Acid II (g) | Equivalents | Amine I (IPD) (g) | Amine II (g) | Equivalent | Amine No. | Melting Point (°C.) |
|---|---|---|---|---|---|---|---|---|
| 16 | 80.00 | 166.49 adipic acid THPA | 0.5 : 0.5 | 199.36 | 24.28 DTA | 0.75 : 0.25 | 81 | 109 |
| 17 | 80.00 | " 168.79 HHPA | 0.5 : 0.5 | 199.67 | 31.30 DPTA | 0.75 : 0.25 | 90 | 88 |
| 18 | 80.00 | " 162.11 PA | 0.5 : 0.5 | 198.77 | 54.88 DHTA | 0.75 : 0.25 | 68 | 104 |
| 19 | 80.00 | " 168.79 HHPA | 0.5 : 0.5 | 199.67 | 30.78 N$_4$-Amine | 0.75 : 0.25 | 87 | 83 |
| 20 | 125.00 | " 111.50 THPA | 0.7 : 0.3 | 217.29 | 26.48 DTA | 0.75 : 0.25 | 81 | 102 |
| 21 | 125.00 | " 113.03 HHPA | 0.7 : 0.3 | 217.50 | 34.10 DPTA | 0.75 : 0.25 | 84 | 104 |
| 22 | 125.00 | " 111.50 THPA | 0.7 : 0.3 | 217.29 | 33.50 N$_4$-Amine | 0.75 : 0.25 | 86 | 107 |
| 23 | 100.00 | azelaic acid 156.20 PA | 0.5 : 0.5 | 194.62 | 23.72 DTA | 0.75 : 0.25 | 67 | 92 |
| 24 | 100.00 | " 162.00 THPA | 0.5 : 0.5 | 196.18 | 30.76 DPTA | 0.75 : 0.25 | 83 | 73 |
| 25 | 115.00 | decamethylene dicarboxylic acid 152.00 THPA | 0.5 : 0.5 | 187.80 | 22.89 DTA | 0.75 : 0.25 | 86 | 68 |
| 26 | 110.00 | azelaic acid 112.67 DMT | 0.5 : 0.5 | 206.10 | 25.12 DTA | 0.75 : 0.25 | 113 | 162 |
| 27 | 120.00 | " 105.24 IPA | 0.5 : 0.5 | 222.43 | 34.86 DPTA | 0.75 : 0.25 | 71 | 157 |

| Example | Acid I (g) | Acid II (g) | Eqivalents | Isophorone diamine (g) | Amine Number | Melting Point (°C.) |
|---|---|---|---|---|---|---|
| 28 | 140.00 adipic acid | 62.00 DMT | 0.75 : 0.25 | 294.69 | 87 | 170 |
| 29 | 85.00 " | 96.71 IPA | 0.75 : 0.25 | 271.38 | 102 | 125 |
| 30 | 140.00 " | 47.27 PA | 0.75 : 0.25 | 292.04 | 105 | 132 |
| 31 | 140.00 " | 50.33 CPTD | 0.8 : 0.2 | 280.98 | 81 | 153 |
| 32 | 105.00 azelaic acid | 107.55 DMT | 0.5 : 0.5 | 262.30 | 96 | 157 |
| 33 | 150.00 " | 71.15 DTHPA | 0.8 : 0.2 | 239.84 | 95 | 92 |
| 34 | 153.04 " | 50.00 BTDA | 0.8 : 0.2 | 240.64 | 96 | 112 |
| 35 | 150.00 sebacic acid | 75.19 THPA | 0.75 : 0.25 | 240.57 | 81 | 91 |
| 36 | 95.00 " | 144.84 HHPA | 0.5 : 0.5 | 233.21 | 86 | 71 |
| 37 | 180.00 decamethylene dicarboxylic acid | 50.66 DMT | 0.75 : 0.25 | 252.60 | 91 | 135 |
| 38 | 150.00 " | 91.72 ETHPA | 0.7 : 0.3 | 231.96 | 88 | 115 |
| 39 | 164.42 brassylic acid | 82.50 DMT | 0.5 : 0.5 | 216.33 | 103 | 121 |
| 40 | 128.31 dimeric fatty acid | 130.00 DMT | 0.25 : 0.75 | 226.85 | 96 | 149 |
| 41 | 55.00 adipic acid | 36.53 DMT and 107.20 dimeric fatty acid | 0.50 : 0.25 : 0.25 | 188.01 | 95 | 108 |
| 42 | 40.00 decamethylene dicarboxylic acid | 101.31 DMT and 99.08 dimeric fatty acid | 0.2:0.6:0.2 | 219.16 | 93 | 132 |
| 43 | 137.50 fluorene dicarboxylic acid | — | 1.0 | 113.97 | 93 | 152 |
| 44 | 150.00 adipic acid | 38.67 DCMB | 0.9 : 0.1 | 270.82 | 94 | 104 |
| 45 | 190.00 sebacic acid | 12.53 acetic acid | 0.9 : 0.1 | 268.71 | 129 | 72 |

| Comparison Example | Acid (g) | Equivalents | Amine (g) | Amine Number | Melting Point (°C.) |
|---|---|---|---|---|---|
| 46 | 400 dimeric fatty acid | 1.0 | 56.95 ethylene diamine | 51 | 97 |

TABLE II

Hardener Adducts (see Example 1)

| Example | Polyaminoamide Hardener pbw* | Type Nr. (Table I) | pbw* | Resin Type | Epoxy Value | Appearance of Adduct Solutions |
|---|---|---|---|---|---|---|
| 1 | 22 | 1 | 3 | Bisphenol A | 0.210 | clear |
| 2 | 20 | 1 | 5 | Bisphenol A | 0.210 | clear |
| 3 | 17 | 1 | 8 | Bisphenol A | 0.210 | clear |
| 4 | 20 | 1 | 5 | Bisphenol A | 0.150 | clear |
| 5 | 22 | 2 | 3 | Bisphenol A | 0.210 | clear |
| 6 | 22 | 3 | 3 | Bisphenol A | 0.210 | clear |
| 7 | 20 | 5 | 5 | Bisphenol A | 0.150 | clear |
| 8 | 22 | 4 | 3 | Bisphenol A | 0.210 | clear |
| 9 | 22 | 5 | 3 | Bisphenol A | 0.210 | clear |
| 10 | 20 | 5 | 5 | Bisphenol A | 0.210 | clear |
| 11 | 22 | 6 | 3 | Bisphenol A | 0.210 | clear |
| 12 | 22 | 7 | 3 | Bisphenol A | 0.210 | clear |
| 13 | 22 | 8 | 3 | Bisphenol A | 0.210 | clear |
| 14 | 22 | 9 | 3 | Bisphenol A | 0.210 | clear |
| 15 | 22 | 10 | 3 | Bisphenol A | 0.210 | clear |
| 16 | 20 | 10 | 5 | Bisphenol A | 0.210 | clear |
| 17 | 22 | 11 | 3 | Bisphenol A | 0.210 | clear |
| 18 | 22 | 11 | 3 | Bisphenol A | 0.150 | clear |
| 19 | 22 | 12 | 3 | Bisphenol A | 0.210 | clear |
| 20 | 22 | 13 | 3 | Bisphenol A | 0.210 | clear |
| 21 | 22 | 14 | 3 | Bisphenol A | 0.210 | clear |
| 22 | 22 | 15 | 3 | Bisphenol A | 0.210 | clear |
| 23 | 22 | 1 | 3 | Novolak | 0.510 | clear |
| 24 | 22 | 1 | 3 | Bisphenol A | 0.210 | clear |
| 25 | 20 | 4 | 5 | Bisphenol A | 0.210 | clear |
| 26 | 22 | 16 | 3 | Bisphenol A | 0.210 | clear |
| 27 | 22 | 17 | 3 | Bisphenol A | 0.210 | clear |
| 28 | 22 | 18 | 3 | Bisphenol A | 0.210 | clear |
| 29 | 20 | 19 | 5 | Bisphenol A | 0.210 | clear |
| 30 | 22 | 19 | 3 | Bisphenol A | 0.210 | clear |
| 31 | 22 | 20 | 3 | Bisphenol A | 0.210 | clear |
| 32 | 22 | 21 | 3 | Bisphenol A | 0.210 | clear |
| 33 | 22 | 22 | 3 | Bisphenol A | 0.150 | clear |
| 34 | 22 | 23 | 3 | Bisphenol A | 0.210 | clear |
| 35 | 22 | 23 | 3 | Bisphenol A | 0.210 | clear |
| 36 | 22 | 24 | 3 | Bisphenol A | 0.210 | clear |
| 37 | 22 | 25 | 3 | Bisphenol A | 0.210 | clear |
| 38 | 20 | 25 | 5 | Bisphenol A | 0.210 | clear |
| 39 | 22 | 26 | 3 | Bisphenol A | 0.210 | clear |
| 40 | 22 | 27 | 3 | Bisphenol A | 0.210 | clear |
| 41 | 22 | 28 | 3 | Bisphenol A | 0.210 | clear |
| 42 | 22 | 29 | 3 | Bisphenol A | 0.210 | clear |
| 43 | 22 | 30 | 3 | Bisphenol A | 0.150 | clear |
| 44 | 22 | 31 | 3 | Bisphenol A | 0.210 | clear |
| 45 | 22 | 32 | 3 | Bisphenol A | 0.210 | clear |
| 46 | 22 | 33 | 3 | Bisphenol A | 0.210 | clear |
| 47 | 22 | 34 | 3 | Bisphenol A | 0.210 | clear |
| 48 | 22 | 35 | 3 | Bisphenol A | 0.210 | clear |
| 49 | 20 | 36 | 5 | Bisphenol A | 0.210 | clear |
| 50 | 22 | 36 | 3 | Bisphenol A | 0.210 | clear |
| 51 | 22 | 36 | 3 | Bisphenol A | 0.150 | clear |
| 52 | 22 | 37 | 3 | Bisphenol A | 0.210 | clear |
| 53 | 22 | 38 | 3 | Bisphenol A | 0.210 | clear |
| 54 | 22 | 39 | 3 | Bisphenol A | 0.210 | clear |
| 55 | 22 | 40 | 3 | Bisphenol A | 0.210 | clear |
| 56 | 22 | 41 | 3 | Bisphenol A | 0.210 | clear |
| 57 | 22 | 42 | 3 | Bisphenol A | 0.210 | clear |
| 58 | 22 | 43 | 3 | Bisphenol A | 0.210 | clear |
| 59 | 22 | 44 | 3 | Bisphenol A | 0.210 | clear |
| 60 | 22 | 45 | 3 | Bisphenol A | 0.210 | clear |
| 61 | 23.4 | 41 | 1.6 | Bisphenol A | 0.420 | clear |
| 62 | 23.7 | 41 | 1.3 | Bisphenol A | 0.530 | clear |
| Comparison Example | | | | | | |
| 63 | 22 | 46 | 3 | Bisphenol A | 0.210 | Not soluble very cloudy |

*All amounts refer to 50% solutions of resin in
(a) Examples 1–22, 26–62 = ethanol/ethyl acetate (1:1)
(b) Example 23 = ethanol/ethyl acetate/methyl ethyl ketone (1:1:1)
(c) Examples 24–25 = ethylene glycol/ethylene glycol acetate (1:1)

TABLE III

Epoxy Resin Adducts (as described in Example 2)

| Ex. | Epoxy Resin pbw* | Resin Type | Epoxy Value | Hardener Adduct pbw* | Adduct No. (see Table II) | Appearance of Adduct Solution |
|---|---|---|---|---|---|---|
| 1 | 20 | Bisphenol A | 0.210 | 5 | 1 | clear |
| 2 | 20 | " | 0.210 | 5 | 2 | clear |
| 3 | 24 | " | 0.210 | 1 | 3 | clear |
| 4 | 20 | " | 0.150 | 5 | 4 | clear |
| 5 | 20 | " | 0.210 | 5 | 5 | clear |
| 6 | 20 | " | 0.210 | 5 | 6 | clear |
| 7 | 20 | " | 0.150 | 5 | 7 | clear |

TABLE III-continued

Epoxy Resin Adducts (as described in Example 2)

| Ex. | Epoxy Resin pbw* | Epoxy Resin Type | Epoxy Value | Hardener Adduct pbw* | Adduct No. (see Table II) | Appearance of Adduct Solution |
|---|---|---|---|---|---|---|
| 8 | 20 | " | 0.210 | 5 | 8 | clear |
| 9 | 20 | " | 0.210 | 5 | 9 | clear |
| 10 | 20 | " | 0.210 | 5 | 10 | clear |
| 11 | 20 | " | 0.210 | 5 | 11 | clear |
| 12 | 20 | " | 0.210 | 5 | 12 | clear |
| 13 | 20 | " | 0.210 | 5 | 13 | clear |
| 14 | 20 | " | 0.210 | 5 | 14 | clear |
| 15 | 20 | " | 0.210 | 5 | 15 | clear |
| 16 | 20 | " | 0.210 | 5 | 16 | clear |
| 17 | 20 | " | 0.210 | 5 | 17 | clear |
| 18 | 20 | " | 0.150 | 5 | 18 | clear |
| 19 | 20 | " | 0.210 | 5 | 19 | clear |
| 20 | 20 | " | 0.210 | 5 | 20 | clear |
| 21 | 20 | " | 0.210 | 5 | 21 | clear |
| 22 | 20 | " | 0.210 | 5 | 22 | clear |
| 23 | 20 | Novolak | 0.510 | 5 | 23 | clear |
| 24 | 20 | Bisphenol A | 0.210 | 5 | 24 | clear |
| 25 | 20 | " | 0.210 | 5 | 25 | clear |
| 26 | 20 | " | 0.210 | 5 | 26 | clear |
| 27 | 20 | " | 0.210 | 5 | 27 | clear |
| 28 | 20 | " | 0.210 | 5 | 28 | clear |
| 29 | 20 | " | 0.210 | 5 | 29 | clear |
| 30 | 20 | " | 0.210 | 5 | 30 | clear |
| 31 | 20 | " | 0.210 | 5 | 31 | clear |
| 32 | 20 | " | 0.210 | 5 | 32 | clear |
| 33 | 20 | " | 0.150 | 5 | 33 | clear |
| 34 | 20 | " | 0.210 | 5 | 34 | clear |
| 35 | 20 | " | 0.210 | 5 | 35 | clear |
| 36 | 20 | " | 0.210 | 5 | 36 | clear |
| 37 | 20 | " | 0.210 | 5 | 37 | clear |
| 38 | 20 | " | 0.210 | 5 | 38 | clear |
| 39 | 20 | " | 0.210 | 5 | 39 | clear |
| 40 | 20 | " | 0.210 | 5 | 40 | clear |
| 41 | 20 | Bisphenol A | 0.210 | 5 | 41 | clear |
| 42 | 20 | " | 0.210 | 5 | 42 | clear |
| 43 | 20 | " | 0.150 | 5 | 43 | clear |
| 44 | 20 | " | 0.210 | 5 | 44 | clear |
| 45 | 20 | " | 0.210 | 5 | 45 | clear |
| 46 | 20 | " | 0.210 | 5 | 46 | clear |
| 47 | 20 | " | 0.210 | 5 | 47 | clear |
| 48 | 20 | " | 0.210 | 5 | 48 | clear |
| 49 | 20 | " | 0.210 | 5 | 49 | clear |
| 50 | 20 | " | 0.210 | 5 | 50 | clear |
| 51 | 20 | " | 0.150 | 5 | 51 | clear |
| 52 | 20 | " | 0.210 | 5 | 52 | clear |
| 53 | 20 | " | 0.210 | 5 | 53 | clear |
| 54 | 20 | " | 0.210 | 5 | 54 | clear |
| 55 | 20 | " | 0.210 | 5 | 55 | clear |
| 56 | 20 | " | 0.210 | 5 | 56 | clear |
| 57 | 20 | " | 0.210 | 5 | 57 | clear |
| 58 | 20 | " | 0.210 | 5 | 58 | clear |
| 59 | 20 | " | 0.210 | 5 | 59 | clear |
| 60 | 20 | " | 0.210 | 5 | 60 | clear |
| 61 | 19 | " | 0.420 | 6 | 61 | clear |
| 62 | 17 | " | 0.530 | 8 | 62 | clear |
| Comparison Example | | | | | | |
| 63 | 20 | Bisphenol A | 0.210 | very cloudy, not usable | | cannot be prepared since the hardener adduct is not usable |

*All amounts refer to 50% of solutions of resin in:
(a) Examples 1–22, 26–62 = ethanol/ethyl acetate (1:1)
(b) Example 23 = ethanol/ethyl acetate/methyl ethyl ketone (1:1:1)
(c) Examples 24–25 = ethylene glycol/ethylene glycol acetate (1:1)

TABLE IV

Adduct Mixing Ratios

| Ex. | Hardener Adduct No. (Table II) | Epoxy Resin Adduct No. (Table III) | Mixing Ratio | Appearance Mixed Adducts | Appearance Pigment-free Printed Films |
|---|---|---|---|---|---|
| 1 | 1 | 1 | 1 : 1.75 | clear | clear |
| 2 | 2 | 2 | 1 : 1.5 | " | " |
| 3 | 3 | 3 | 1 : 0.77 | " | " |
| 4 | 4 | 4 | 1 : 2.1 | " | " |
| 5 | 5 | 5 | 1 : 2.74 | " | " |
| 6 | 6 | 6 | 1 : 1.3 | " | " |
| 7 | 7 | 7 | 1 : 2.1 | " | " |
| 8 | 8 | 8 | 1 : 1.75 | " | " |
| 9 | 9 | 9 | 1 : 1.75 | " | " |
| 10 | 10 | 10 | 1 : 1.5 | " | " |
| 11 | 11 | 11 | 1 : 1.75 | " | " |
| 12 | 12 | 12 | 1 : 1.75 | " | " |
| 13 | 13 | 13 | 1 : 1.75 | " | " |
| 14 | 14 | 14 | 1 : 1.75 | " | " |
| 15 | 15 | 15 | 1 : 1.75 | " | " |
| 16 | 16 | 16 | 1 : 1.5 | " | " |
| 17 | 17 | 17 | 1 : 1.75 | " | " |
| 18 | 18 | 18 | 1 : 2.4 | " | " |
| 19 | 19 | 19 | 1 : 1.75 | " | " |
| 20 | 20 | 20 | 1 : 1.75 | " | " |
| 21 | 21 | 21 | 1 : 1.3 | " | " |
| 22 | 22 | 22 | 1 : 1.3 | " | " |
| 23 | 23 | 23 | 1 : 0.76 | " | " |
| 24 | 24 | 24 | 1 : 1.75 | " | " |
| 25 | 25 | 25 | 1 : 1.5 | " | " |
| 26 | 26 | 26 | 1 : 1.3 | " | " |
| 27 | 27 | 27 | 1 : 1.75 | " | " |
| 28 | 28 | 28 | 1 : 1.3 | " | " |
| 29 | 29 | 29 | 1 : 1.5 | " | " |
| 30 | 30 | 30 | 1 : 1.75 | " | " |
| 31 | 31 | 31 | 1 : 1.3 | " | " |
| 32 | 32 | 32 | 1 : 1.3 | " | " |
| 33 | 33 | 33 | 1 : 2.4 | " | " |
| 34 | 34 | 34 | 1 : 1.3 | " | " |
| 35 | 35 | 35 | 1 : 1.3 | " | " |
| 36 | 36 | 36 | 1 : 1.3 | " | " |
| 37 | 37 | 37 | 1 : 1.75 | " | " |
| 38 | 38 | 38 | 1 : 1.5 | " | " |
| 39 | 39 | 39 | 1 : 1.75 | clear | clear |
| 40 | 40 | 40 | 1 : 1.3 | " | " |
| 41 | 41 | 41 | 1 : 1.75 | " | " |
| 42 | 42 | 42 | 1 : 1.75 | " | " |
| 43 | 43 | 43 | 1 : 2.4 | " | " |
| 44 | 44 | 44 | 1 : 1.3 | " | " |
| 45 | 45 | 45 | 1 : 1.75 | " | " |
| 46 | 46 | 46 | 1 : 1.75 | " | " |
| 47 | 47 | 47 | 1 : 1.75 | " | " |
| 48 | 48 | 48 | 1 : 1.3 | " | " |
| 49 | 49 | 49 | 1 : 1.5 | " | " |
| 50 | 50 | 50 | 1 : 1.75 | " | " |
| 51 | 51 | 51 | 1 : 2.4 | " | " |
| 52 | 52 | 52 | 1 : 1.75 | " | " |
| 53 | 53 | 53 | 1 : 1.75 | " | " |
| 54 | 54 | 54 | 1 : 1.75 | " | " |
| 55 | 55 | 55 | 1 : 1.75 | " | " |
| 56 | 56 | 56 | 1 : 1.75 | " | " |
| 57 | 57 | 57 | 1 : 1.75 | " | " |
| 58 | 58 | 58 | 1 : 1.75 | " | " |
| 59 | 59 | 59 | 1 : 1.75 | " | " |
| 60 | 60 | 60 | 1 : 1.75 | " | " |
| 61 | 61 | 61 | 1 : 1.3 | " | " |
| 62 | 62 | 62 | 1 : 1.3 | " | " |
| Comparison Example | | | | | |
| 63 | Not usable cloudy | not preparable | — | — | — |

The mixing ratios can be undercut or exceeded. However, the ratios of amounts must be so adjusted that printed films having good mechanical, chemical, and thermal resistances are obtained.

TABLE V

Properties of Printed Films

| Example Hardener No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|

TABLE V-continued

Properties of Printed Films

| (Table I) Mixture No. | 1 | 5 | 8 | 9 | 11 | 13 | 17 | 20 | 23 | 27 | 28 | 40 | 41 | 42 |
|---|---|---|---|---|---|---|---|---|---|---|---|---|---|---|
| (Table IV) | 1 | 9 | 13 | 14 | 17 | 20 | 27 | 31 | 34 | 40 | 41 | 55 | 56 | 57 |
| Blocking Point (°C.) | 120 | 140 | 130 | 140 | 100 | 140 | 110 | 105 | 100 | 130 | 140 | 140 | 130 | 140 | 70 |

*Comparison example using a commercially-available thermoplastic polyamide resin comprising dimerized fatty acid, acetic acid, ethylene diamine, and propylene diamine; amine number = 3.2; acid number = 2.7; soluble in methanol.

TABLE VI

Hardener Compatibility

| Ex. | Polyaminoamide Hardener No. (Table I) | Commercially-available Hardeners for Epoxy Resins (Table VIIa) | | | | | | | | | | |
|---|---|---|---|---|---|---|---|---|---|---|---|---|
| | | 1 | 2 | 3 | 4 | 5 | 6 | 7 | 8 | 9 | 10 | 11 |
| 1 | 1 | − | − | − | − | + | + | + | + | + | + | + |
| 2 | 4 | − | − | − | + | + | + | + | + | + | + | + |
| 3 | 5 | − | − | − | − | + | + | + | + | + | + | + |
| 4 | 9 | + | + | + | + | + | + | + | + | + | + | + |
| 5 | 11 | + | + | + | + | + | + | + | + | + | + | + |
| 6 | 18 | − | − | − | − | + | + | + | + | + | + | + |
| 7 | 24 | − | − | − | − | + | + | + | + | + | + | + |
| 8 | 25 | − | − | − | − | + | + | + | + | + | + | + |
| 9 | 27 | − | − | − | − | + | + | + | + | + | + | + |
| 10 | 28 | − | − | − | − | + | + | + | + | + | + | + |
| 11 | 29 | − | − | − | − | + | + | + | + | + | + | + |
| 12 | 32 | − | − | − | − | + | + | + | + | + | + | + |
| 13 | 35 | − | − | − | − | + | + | + | + | + | + | + |
| 14 | 37 | − | − | − | − | + | + | + | + | + | + | + |
| 15 | 39 | − | − | − | − | + | + | + | + | + | + | + |
| 16 | 40 | + | + | + | + | + | + | + | + | + | + | + |
| 17 | 41 | + | + | + | + | + | + | + | + | + | + | + |
| 18 | 42 | + | + | + | + | + | + | + | + | + | + | + |

Key:
+ = compatible
− = not compatible

TABLE VII

Hardener and Hardener Adducts [cf. methods 1(c) and 1(e)]

| Example | Polyaminoamide Hardener Type No (Table I) | pbw* | Commercial Hardener for Epoxy Resins No. (Table VIIa) | pbw* | Ratio | Epoxy Resin Type | Epoxy Value | pbw* | Appearance of Adduct Solution |
|---|---|---|---|---|---|---|---|---|---|
| 1 | 9 | 18.0 | 1 | 4.0 | 4.5:1 | Bisphenol A | 0.210 | 3 | clear |
| 2 | 11 | 14.7 | 1 | 7.3 | 2:1 | " | 0.210 | 3 | " |
| 3 | 40 | 18.3 | 2 | 3.7 | 5:1 | " | 0.210 | 3 | " |
| 4 | 41 | 18.0 | 3 | 4.0 | 4.5:1 | " | 0.210 | 3 | " |
| 5 | 42 | 18.3 | 4 | 3.7 | 5:1 | " | 0.210 | 3 | " |
| 6 | 1 | 18.9 | 5 | 3.1 | 6:1 | " | 0.210 | 3 | " |
| 7 | 4 | 18.9 | 7 | 3.1 | 6:1 | " | 0.210 | 3 | " |
| 8 | 5 | 18.3 | 6 | 3.7 | 5:1 | " | 0.210 | 3 | " |
| 9 | 18 | 18.3 | 8 | 3.7 | 5:1 | " | 0.210 | 3 | " |
| 10 | 9 | 18.3 | 9 | 3.7 | 5:1 | — | 0.210 | 3 | " |
| 11 | 25 | 18.3 | 10 | 3.7 | 5:1 | " | 0.210 | 3 | " |
| 12 | 27 | 18.3 | 11 | 3.7 | 5:1 | " | 0.210 | 3 | " |
| 13 | 28 | 18.3 | 7 | 3.7 | 5:1 | " | 0.210 | 3 | " |
| 14 | 29 | 17.6 | 5 | 4.4 | 4:1 | " | 0.210 | 3 | " |
| 15 | 32 | 17.6 | 6 | 4.4 | 4:1 | " | 0.210 | 3 | " |
| 16 | 35 | 16.5 | 6 | 5.5 | 3:1 | " | 0.210 | 3 | " |
| 17 | 27 | 18.3 | 6 | 3.7 | 5:1 | " | 0.210 | 3 | " |
| 18 | 39 | 18.3 | 6 | 3.7 | 5:1 | " | 0.210 | 3 | " |
| 19 | 41 | 18.3 | 1 | 3.7 | 5:1 | " | 0.420 | 1.5 | " |
| 20 | 41 | 18.3 | 1 | 3.7 | 5:1 | " | 0.530 | 1.2 | " |
| 21 | — | — | 5 | 20 | — | " | 0.210 | 5 | " |
| 22 | — | — | 7 | 22 | — | " | 0.210 | 3 | " |
| 23 | — | — | 5 and 7 | 12 and 10 | — | " | 0.210 | 3 | " |
| 24 | — | — | 21# and 22# | 15 and 10 | — | — | — | — | " |
| 25 | — | — | 2 | 25 | — | — | — | — | " |
| 26 | — | — | 5 and 2 | 20 and 5 | — | — | — | — | " |
| 27 | — | — | 5# and 22# | 17 and 8 | — | — | — | — | " |
| 28 | 1 | 18.9 and | — | — | — | Bisphenol A | 0.210 | 3 | " |
| | | 5 | | 3.1 | | — | — | — | |
| 29 | 1 | 15.8 and and | — | — | — | Bisphenol A | 0.210 | 3 | clear |
| | | 5 | | 3.1 | | — | — | — | |
| | | 7 | | 3.1 | | — | — | — | |
| 30 | 41 | 15.8 | — | — | — | Bisphenol A | 0.210 | 3 | " |

TABLE VII-continued

| | Poly-aminoamide Hardener | | Commercial Hardener for Epoxy Resins | | | Epoxy Resin | | | Appearance of Adduct Solution |
|---|---|---|---|---|---|---|---|---|---|
| Example | Type No (Table I) | pbw* | No. (Table VIIa) | pbw* | Ratio | Resin Type | Epoxy Value | pbw* | |
| | | and | 2 | 3.1 | — | — | — | — | |
| | | and | 22# | 3.1 | — | — | — | — | |
| 31 | 41 | 12.7 | — | — | — | Bisphenol A | 0.210 | 3 | " |
| | | and | 5 | 3.1 | — | — | — | — | |
| | | and | 2 | 3.1 | — | — | — | — | |
| | | and | 22# | 3.1 | — | — | — | — | |

*All amounts refer to 50% resin solutions in
(a) Examples 1–17 and 19–31 = ethanol/ethyl acetate (1:1)
(b) Example 18 = ethylene glycol/ethylene glycol acetate (1:1)
From this table (Table VII)

TABLE VIIa

Composition of Commercial Hardeners for Epoxy Resins

| Hardener | | Amine Hydrogen Equivalent Weight |
|---|---|---|
| 1 | Condensation product comprising dimerized fatty acid and diethylene triamine (amino groups: carboxy groups = 1:1) | 475 |
| 2 | As in 1, but the amine component is triethylene tetramine. | 237 |
| 3 | As in 1, but the amine component is a mixture of hydrogenated mono- and di-cyanylated ethylene diamine. | 237 |
| 4 | Condensation product comprising triethylene tetramine and an addition product of acrylic and oleic acids. | 237 |
| 5 | As in 2 with an augmented content of imidazoline. | 95 |
| 6 | Condensation product comprising monomeric fatty acid and triethylene tetramine. | 93 |
| 7 | Hardener comprising dipropylene triamine. | 28 |
| 8 | Isolated amine adduct comprising an excess of ethylene diamine and an epoxy resin comprising bisphenol A and having an epoxy value of 0.21. | 166 |
| 9 | Phenol-formaldehyde-trimethylhexamethylene diamine condensation product. | 74 |
| 10 | Amine adduct comprising an excess of poly-alkylenepolyamine (formula I) prepared with an accelerator having an aromatic nucleus and hydroxy groups. | 111 |
| 11 | Hardener comprising an aromatic amine. | 111 |

TABLE VIII

Epoxy Resin Adducts [cf. method 2 (a)]

| | Epoxy Resin | | | Polyaminoamide Hardener | | Appearance of Adduct Solutions |
|---|---|---|---|---|---|---|
| Ex. | Resin Type | Epoxy Value | pbw* | Type No. (Table I) | pbw* | |
| 1 | Bisphenol A | 0.210 | 21 | 9 | 4 | clear |
| 2 | Bisphenol A | 0.210 | 21 | 11 | 4 | " |
| 3 | Bisphenol A | 0.210 | 21 | 40 | 4 | " |
| 4 | Bisphenol A | 0.210 | 21 | 41 | 4 | " |
| 5 | Bisphenol A | 0.210 | 21 | 42 | 4 | " |
| 6 | Bisphenol A | 0.210 | 21 | 1 | 4 | " |
| 7 | Bisphenol A | 0.210 | 21 | 4 | 4 | " |
| 8 | Bisphenol A | 0.210 | 21 | 5 | 4 | " |
| 9 | Bisphenol A | 0.210 | 21 | 18 | 4 | " |
| 10 | Bisphenol A | 0.210 | 21 | 9 | 4 | " |
| 11 | Bisphenol A | 0.210 | 21 | 25 | 4 | " |
| 12 | Bisphenol A | 0.210 | 21 | 27 | 4 | " |
| 13 | Bisphenol A | 0.210 | 21 | 28 | 4 | " |
| 14 | Bisphenol A | 0.210 | 21 | 29 | 4 | " |
| 15 | Bisphenol A | 0.210 | 21 | 32 | 4 | " |
| 16 | Bisphenol A | 0.210 | 21 | 35 | 4 | " |
| 17 | Bisphenol A | 0.210 | 21 | 27 | 4 | " |
| 18 | Bisphenol | 0.210 | 21 | 39 | 4 | " |

TABLE VIII-continued

Epoxy Resin Adducts [cf. method 2 (a)]

| Ex. | Epoxy Resin Resin Type | Epoxy Value | pbw* | Polyaminoamide Hardener Type No. (Table I) | pbw* | Appearance of Adduct Solutions |
|---|---|---|---|---|---|---|
| | phenol A | | | | | |
| 19 | Bisphenol A | 0.420 | 10.5 | 1 | 4 | " |
| 20 | Bisphenol A | 0.530 | 8.3 | 1 | 4 | " |
| 21 | Bisphenol A | 0.210 | 21 | 1 | 4 | " |
| 22 | Bisphenol A | 0.210 | 21 | 41 | 4 | " |
| 23 | Bisphenol A | 0.210 | 21 | 29 | 4 | " |
| 24 | Bisphenol A | 0.420 | 10.5 | 29 | 4 | " |

*All amounts refer to 50% resin solutions in:
(a) Examples 1-17 and 19-24 = ethanol/ethyl acetate (1:1)
(b) Example 18 = ethylene glycol/ethylene glycol acetate (1:1)

TABLE IX

Mixing Ratios

| Ex. | Hardener or Hardener Adduct No. (Table VII) | Epoxy Resin Adduct No. (Table VIII) | Mixing Ratio | Appearance Mixed Adducts | Pigment-free Printed Films |
|---|---|---|---|---|---|
| 1 | 1 | 1 | 1 : 1.87 | clear | clear |
| 2 | 2 | 2 | 1 : 1.76 | " | " |
| 3 | 3 | 3 | 1 : 2.12 | " | " |
| 4 | 4 | 4 | 1 : 2.13 | " | " |
| 5 | 5 | 5 | 1 : 2.12 | " | " |
| 6 | 6 | 6 | 1 : 2.72 | " | " |
| 7 | 7 | 7 | 1 : 5.14 | " | " |
| 8 | 8 | 8 | 1 : 2.90 | " | " |
| 9 | 9 | 9 | 1 : 1.85 | " | " |
| 10 | 10 | 10 | 1 : 3.22 | " | " |
| 11 | 11 | 11 | 1 : 2.69 | " | " |
| 12 | 12 | 12 | 1 : 2.20 | " | " |
| 13 | 13 | 13 | 1 : 5.74 | " | " |
| 14 | 14 | 14 | 1 : 3.03 | " | " |
| 15 | 15 | 15 | 1 : 3.06 | " | " |
| 16 | 16 | 16 | 1 : 2.89 | " | " |
| 17 | 17 | 17 | 1 : 2.41 | " | " |
| 18 | 18 | 18 | 1 : 2.98 | " | " |
| 19 | 19 | 19 | 1 : 1.16 | " | " |
| 20 | 20 | 20 | 1 : 1 | " | " |
| 21 | 21 | 22 | 1 : 6.3 | " | " |
| 22 | 22 | 24 | 1 : 14.4 | " | " |
| 23 | 22 | 21 | 1 : 14.9 | " | " |
| 24 | 24 | 23 | 1 : 13.5 | " | " |
| 25 | 25 | 22 | 1 : 3.3 | " | " |
| 26 | 26 | 22 | 1 : 7.3 | " | " |
| 27 | 27 | 22 | 1 : 13.4 | " | " |
| 28 | 28 | 21 | 1 : 2.7 | " | " |
| 29 | 29 | 21 | 1 : 5.9 | " | " |
| 30 | 30 | 22 | 1 : 4.8 | " | " |
| 31 | 31 | 22 | 1 : 5.5 | " | " |

The mixing ratios can be undercut or exceeded. However, the ratios of amounts must be so adjusted that printed films having good mechanical, chemical, and thermal resistances are obtained.

Table X

Properties of Printed Films

| Ex. | Hardener or Hardener Adduct No. (Table VII) | Epoxy Resin Adduct No. (Table VIII) | Mixing Ratio | Blocking Point (°C.) | Adhesion | Scratch Resistance | Water | 10% Citric Acid | 10% Acetic Acid | 10% Lactic Acid | 1% Detergent Solution | 1% Soup Solution | Oil-Fat |
|---|---|---|---|---|---|---|---|---|---|---|---|---|---|
| 1 | 2 | 2 | 1:1.76 | 140 | 1-2 | 2-3 | 1.9 | 2.0 | 2.2 | 2.1 | 2.0 | 1.8 | 1-2 |
| 2 | 3 | 3 | 1:2.12 | 140 | 1-2 | 2 | 1.6 | 1.8 | 1.8 | 1.8 | 1.9 | 1.5 | 1-2 |
| 3 | 4 | 4 | 1:2.13 | 140 | 1-2 | 2-3 | 1.8 | 1.9 | 2.0 | 2.0 | 1.9 | 2.0 | 1-2 |
| 4 | 6 | 6 | 1:2.72 | 130 | 1-2 | 2 | 1.7 | 1.8 | 2.0 | 2.0 | 1.7 | 1.8 | 1-2 |
| 5 | 10 | 10 | 1:3.22 | 110 | 1-2 | 2 | 2.0 | 2.1 | 2.4 | 2.0 | 1.9 | 2.1 | 1-2 |
| 6 | 13 | 13 | 1:5.74 | 140 | 1-2 | 2 | 1.8 | 1.7 | 1.8 | 1.7 | 1.7 | 1.7 | 1-2 |
| 7 | 17 | 17 | 1:2.41 | 140 | 1-2 | 2 | 1.9 | 1.7 | 2.1 | 1.8 | 1.8 | 1.9 | 1-2 |
| 8 | 9 | 9 | 1:1.85 | 140 | 1-2 | 2-3 | 1.8 | 2.0 | 2.2 | 1.9 | 2.0 | 1.9 | 1-2 |
| 9 | 19 | 19 | 1:1.16 | 130 | 1-2 | 2-3 | 1.8 | 2.0 | 1.9 | 2.1 | 2.0 | 2.0 | 1-2 |
| 10 | 20 | 20 | 1:1 | 140 | 1-2 | 2-3 | 2.1 | 1.9 | 1.9 | 2.0 | 1.9 | 2.0 | 1-2 |
| 11 | 26 | 22 | 1:7.3 | 135 | 1-2 | 2-3 | 1.9 | 1.9 | 2.2 | 1.7 | 1.8 | 1.9 | 1-2 |
| 12 | 21 | 22 | 1:6.3 | 130 | 1-2 | 2-3 | 1.8 | 1.8 | 2.1 | 1.8 | 1.9 | 1.8 | 1-2 |
| 13 | 27 | 22 | 1:13.4 | 140 | 1-2 | 2 | 1.9 | 1.9 | 1.9 | 1.7 | 2.0 | 1.7 | 1-2 |
| 14 | 28 | 21 | 1:2.7 | 130 | 1-2 | 2 | 2.0 | 2.0 | 2.1 | 1.9 | 1.9 | 2.0 | 1-2 |
| 15 | 30 | 22 | 1:4.8 | 140 | 1-2 | 2-3 | 2.0 | 1.9 | 2.2 | 2.0 | 1.8 | 2.0 | 1-2 |

What is claimed is:

1. A synthetic resin mixture adaptable to use as a binder in surface coatings and in printing inks, which mixture comprises a component (A) which is at least one amine selected from the group consisting of
(A) (I) a solid polyaminoamide having an amine number from 30 to 200 prepared from an acid component (a) comprising
(a) (1) an aliphatic dicarboxylic acid having 6 to 13 carbon atoms, and an excess of an amine component (b) comprising
(b) (1) a diamine of the formula

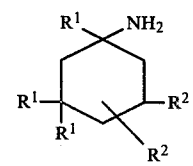

wherein $R^1$ is hydrogen or methyl and $R^2$ is $-CH_2-NH_2$ or $-C(CH_3)_2-NH_2$, (A) (II) Aminoamide compounds, aminoimidazoline compounds, and aminoamide compounds containing imidazoline groups having amine hydrogen equivalent weights from 90 to 500 and comprising polyalkylenepolyamines of the formula $$H_2N + (CHR)_x - NH_{\overline{y}}H,$$

wherein R is hydrogen or alkyl having 1 to 4 carbon atoms, x is an integer from 2 to 6, and y is an integer from 2 to 4, (A) (III) (a) amines of the formula $$H_2N + (CHR)_x - NH_{\overline{y}}H,$$

wherein R, x, and y are as earlier defined, and
(b) amines of the formula $$H_2N-(CHR)_x-NH_2 \qquad \text{III}$$

in which R is hydrogen or alkyl having 1 to 4 carbon atoms and x is an integer from 2 to 6, and
(A) (IV) a Mannich base having at least two reactive amine hydrogen atoms and suitable for hardening epoxy resins,
or wherein said first component (A) of said mixture is at least one adduct having free amino groups and formed by reacting an epoxy resin with an excess of an amine (A) (I), (A) (II), (A) (III), or (A) (IV),
or wherein said first component (A) of said mixture is a mixture of at least one of said amines (A) (I), (A) (II), (A) (III), or (A) (IV) with at least one of said adducts;
and which mixture further comprises a synthetic resin component (B) having free epoxy groups comprising an adduct formed between a solid polyaminoamide as in (A) (I) and an excess of an epoxy resin.

2. A synthetic resin mixture as in claim 1 wherein said acid component (A) (I) (a) additionally comprises
   (a) (2) an aromatic, araliphatic, or hydroaromatic dicarboxylic acid, which can be optionally alkyl-substituted, in amounts from 0.95 to 0.05 equivalents, calculated on the total number of carboxyl groups.

3. A synthetic resin mixture as in claim 1 wherein said acid component (A) (I) (a) additionally comprises
   (a) (3) an aliphatic hydroaromatic, or aromatic monocarboxylic acid or a monofunctionally-acting acid or acid anhydride.

4. A synthetic resin mixture as in claim 1 wherein said acid component (A) (I) (a) additionally comprises a member selected from the group consisting of
   (a) (4) a dimeric fatty acid, an addition product of acrylic acid on an unsaturated fatty acid, and heptadecandicarboxylic acid.

5. A synthetic resin mixture as in claim 1 wherein said amine component (A) (I) (b) additionally comprises
   (b) (2) an amine of the formula $$H_2N + (CHR)_x - NH_{\overline{y}}H,$$

wherein R is hydrogen or alkyl having 1 to 4 carbon atoms, x is an integer from 2 to 6, and y is an integer from 2 to 4.

6. A synthetic resin mixture as in claim 1 wherein said component (A) is a mixture of at least two of said amines (A) (II), (A) (III), and (A) (IV).

7. A synthetic resin mixture as in claim 1 wherein said component (A) is an adduct having free amino groups formed by reacting an epoxy resin with an excess of an amine (A) (I), (A) (II), (A) (III), or (A) (IV).

8. A synthetic resin mixture as in claim 1 wherein said component (A) is a mixture of at least two adducts each having free amino groups and formed by reacting an epoxy resin with an excess of an amine (A) (I), (A) (II), (A) (III), or (A) (IV).

9. A synthetic resin mixture as in claim 1 wherein said component (A) is a mixture of at least one amine (A) (I), (A) (II), (A) (III), or (A) (II) and at least one adduct having free amino groups and formed by reacting an epoxy resin with an excess of an amine (A) (I), (A) (II), (A) (III), or (A) (IV).

10. A synthetic resin mixture as in claim 1 wherein said component (A) is a mixture of at least one amine (A) (I), (A) (II), (A) (III), and (A) (IV) with an adduct having free amino groups and formed by reacting an epoxy resin with an excess of amine (A) (I).

11. A synthetic resin mixture as in claim 1 wherein said component (A) is a mixture of a first adduct having free amino groups and formed by reacting an epoxy resin with an amine (A) (I) with at least one second adduct having free amino groups and formed by reacting an epoxy resin with an amine (A) (II), A (III), or (A) (IV).

12. A synthetic resin mixture as in claim 11 wherein said second adduct is an adduct formed from amine (A) (II).

13. A synthetic resin mixture as in claim 1 wherein said component (A) is a mixture of an adduct having free amino groups and formed by reacting an epoxy resin with an amine (A) (I), at least one amine (A) (II), (A) (III), or (A) (IV), and at least one adduct having free amino groups and formed by reacting an epoxy resin with an amine (A) (II), (A) (III), or (A) (IV).

* * * * *